United States Patent
Sasaki et al.

(10) Patent No.: US 6,899,640 B2
(45) Date of Patent: *May 31, 2005

(54) ONE-PIECE GOLF BALL

(75) Inventors: Hiroto Sasaki, Chichibu (JP); Hiroshi Higuchi, Chichibu (JP); Nobuyuki Kataoka, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/720,544

(22) Filed: Nov. 25, 2003

(65) Prior Publication Data

US 2004/0106475 A1 Jun. 3, 2004

(30) Foreign Application Priority Data

Nov. 29, 2002 (JP) ........................................ 2002-347999

(51) Int. Cl.$^7$ .......................... A63B 37/04; A63B 37/06; A63B 37/00
(52) U.S. Cl. ....................................... 473/371; 473/351
(58) Field of Search ................................. 473/351–377

(56) References Cited

U.S. PATENT DOCUMENTS

| | | | |
|---|---|---|---|
| 4,546,980 A | | 10/1985 | Gendreau et al. |
| 4,683,257 A | * | 7/1987 | Kakiuchi et al. ............ 524/432 |
| 4,692,497 A | | 9/1987 | Gendreau et al. |
| 4,770,422 A | | 9/1988 | Isaac |
| 4,929,678 A | | 5/1990 | Hamada |
| 4,955,613 A | * | 9/1990 | Gendreau et al. ............ 473/372 |
| 5,585,440 A | * | 12/1996 | Yamada et al. .............. 525/193 |
| 6,376,612 B1 | * | 4/2002 | Nesbitt et al. ............... 525/236 |
| 6,642,314 B2 | * | 11/2003 | Sone et al. ................... 525/232 |
| 6,695,716 B2 | * | 2/2004 | Higuchi et al. .............. 473/357 |

FOREIGN PATENT DOCUMENTS

| | | |
|---|---|---|
| JP | 62-89750 A | 4/1987 |
| JP | 63-275356 A | 11/1988 |
| JP | 2-268778 A | 11/1990 |
| JP | 3-151985 A | 6/1991 |
| JP | 11-35633 | 2/1999 |
| JP | 11-70187 A | 3/1999 |
| JP | 11-164912 A | 6/1999 |
| JP | 11-319148 A | 11/1999 |
| JP | 2001-149505 | 6/2001 |
| JP | 2001-149506 | 6/2001 |
| JP | 2001-149507 | 6/2001 |
| JP | 2002-293996 | 10/2002 |

OTHER PUBLICATIONS

Report of Research & Development; Fine Chemical; vol. 23; No. 9; Jun. 1, 1994; pp. 5–15.

C. Jeff Harlan et al., "Three–Coordinate Aluminum is Not a Prerequisite for Catalytic Activity in the Zirconocent—Alumoxane Polymerization of Ethylene", *J. Am. Chem. Soc.*, 1995, 117, pp. 6465–6474.

Mark R. Mason, "Hydrolysis of Tri–tert–butylaluminum: The First Structural Characterization of Alkylalumoxanes", *J. Am. Chem. Soc.*, 1993, 115, pp. 4971–4984.

* cited by examiner

*Primary Examiner*—Gregory Vidovich
*Assistant Examiner*—Alvin A. Hunter, Jr.
(74) *Attorney, Agent, or Firm*—Sughrue Mion, PLLC

(57) ABSTRACT

Disclosed herein is a one-piece golf ball formed by vulcanization from a rubber composition composed of 100 parts by weight of rubber base material, 10 to 40 parts by weight of unsaturated carboxylic acid, 10 to 60 parts by weight of metal oxide, and 0.9 to 5 parts by weight of organic peroxide, said rubber base material containing 60 to 100% by weight based on the weight of a polybutadiene which is synthesized with a catalyst of rare earth element, contains no less than 60% of cis-1,4-linkage, and has a Mooney viscosity ($ML_{1+4}(100°\ C.)$) no less than 40. This golf ball has good shot feeling and high rebound resilience and is easy to produce by extrusion.

6 Claims, No Drawings

ONE-PIECE GOLF BALL

BACKGROUND OF THE INVENTION

The present invention relates to a one-piece solid golf ball characterized by good rebound resilience and flying performance.

Many attempts have so far been made to impart good rebound resilience to golf balls by improving the compounding of polybutadiene as a rubber base material.

For example, JP-A 62-89750 discloses a rubber composition for solid golf balls which is compounded from a polybutadiene having a Mooney viscosity of 70 to 100 synthesized with a catalyst of Ni and Co and either of a polybutadiene having a Mooney viscosity of 30 to 90 synthesized with a catalyst of lanthanoid or a polybutadiene having a Mooney viscosity of 20 to 50 synthesized with a catalyst of Ni and Co. The rubber composition, however, has room for further improvement in rebound resilience.

JP-A 2-268778 discloses a golf ball formed from a rubber composition compounded from a polybutadiene having a Mooney viscosity lower than 50 which is synthesized with a catalyst of Group VIII element and a polybutadiene having a Mooney viscosity lower than 50 which is synthesized with a catalyst of lanthanoid. This golf ball, however, is poor in rebound resilience.

Moreover, JP-A 11-70187 discloses a multi-piece solid golf ball having an intermediate layer formed from a polybutadiene having a low Mooney viscosity. JP-A 11-319148 discloses a solid golf ball formed from a rubber composition containing a polybutadiene having a Mooney viscosity of 50 to 69 synthesized with a catalyst of Ni and Co and a polybutadiene having a Mooney viscosity of 20 to 90 synthesized with a catalyst of lanthanoid. JP-A 11-164912 discloses a solid golf ball formed from a rubber composition in which the content of 1,2-vinyl linkage is no more than 2.0% and the ratio of Mw/Mn is no higher than 3.5 (where Mw stands for weight-average molecular weight and Mn stands for number-average molecular weight). JP-A 63-275356 discloses a golf ball formed from a rubber composition incorporated with a polybutadiene having a high Mooney viscosity. JP-A 3-151985 discloses a golf ball formed from a rubber composition containing two kinds of polybutadiene differing in number-average molecular weight. None of these golf balls are satisfactory in rebound resilience.

In addition, JP-A 61-71070 discloses a rubber composition in which two kinds of organic peroxides are used. JP-A 62-112574 discloses a rubber composition in which a small amount of organic peroxide is used. These rubber compositions, however, are deficient in rebound resilience and poor in productivity due to slow vulcanization.

Further additional golf balls are disclosed in JP-A 2001-149505, 2001-149506, 2001-149507, and 2002-293996. However, they have still room for improvement in rebound resilience.

SUMMARY OF THE INVENTION

The present invention was completed in view of the foregoing. It is an object of the present invention to provide a one-piece golf ball which is easy to form by extrusion and is characterized by good shot feeling, high rebound resilience, and outstanding flying performance.

To achieve the above-mentioned object, the present inventors carried out a series of researches, which led to the finding that it is possible to obtain a one-piece solid golf ball, which is easy to form by extrusion and is characterized by good shot feeling, and high rebound resilience, by vulcanization from a rubber composition composed of 100 parts by weight of rubber base material, 10 to 40 parts by weight of unsaturated carboxylic acid, 10 to 60 parts by weight of metal oxide, and 0.9 to 5 parts by weight of organic peroxide, said rubber base material containing a polybutadiene which is synthesized with a catalyst of rare earth element, contains no less than 60% of cis-1,4-linkage, and has a Mooney viscosity ($ML_{1+4}(100°$ C.)) no less than 40, said rubber composition optionally containing 0.1 to 5 parts by weight of organic sulfur compound, 5 to 80 parts by weight of inorganic filler, and two or more kinds of organic peroxides, the one with a shortest half-life (at 155° C.) being designated as (a) and the other with a longest half-life being designated as (b), such that the ratio $b_t/a_t$ is no less than 7 and no more than 20, where $a_t$ denotes the half-life of (a) and the $b_t$ denotes the half-life of (b).

Thus, the present invention is directed to a one-piece golf ball as defined in the following.

The first aspect: A one-piece golf ball formed by vulcanization from a rubber composition composed of 100 parts by weight of rubber base material, 10 to 40 parts by weight of unsaturated carboxylic acid, 10 to 60 parts by weight of metal oxide, and 0.9 to 5 parts by weight of organic peroxide, said rubber base material containing 60 to 100% by weight of a polybutadiene which is synthesized with a catalyst of rare earth element, contains no less than 60% of cis-1,4-linkage, and has a Mooney viscosity ($ML_{1+4}(100°$ C.)) no less than 40.

The second aspect: The one-piece golf ball as defined in the first aspect, wherein the polybutadiene is one which has a molecular weight distribution Mw/Mn of 2.0 to 8.0 (where Mw stands for weight-average molecular weight and Mn stands for number-average molecular weight).

The third aspect: The one-piece golf ball as defined in the first or second aspect, wherein the polybutadiene is one which is obtained by synthesis with an Nd-based catalyst and subsequent reaction with a terminal modifier.

The fourth aspect: The one-piece golf ball as defined in any of the first to third aspects, wherein the rubber base material contains, in addition to the polybutadiene, no more than 40% by weight of a second polybutadiene which is synthesized with a catalyst of Group VIII element and has a Mooney viscosity ($ML_{1+4}(100°$ C.)) less than 50.

The fifth aspect: The one-piece golf ball as defined in the fourth aspect, wherein the second polybutadiene is one which has a molecular weight distribution Mw/Mn of 3.0 to 6.0 and a solution viscosity no less than 100 mPa·s and no more than 500 mPa·s in toluene (5% by weight) at 25° C.

The sixth aspect: The one-piece golf ball as defined in any of the first to fifth aspects, wherein the rubber base material contains (based on 100 parts by weight) 0.2 to 5 parts by weight of organic sulfur compound.

The seventh aspect: The one-piece golf ball as defined in any of the first to sixth aspects, wherein the rubber composition contains two or more kinds of organic peroxide, the one with a shortest half-life (at 155° C.) being designated as (a) and the other with a longest half-life being designated as (b), such that the ratio $b_t/a_t$ is no less than 7 and no more than 20, where $a_t$ denotes the half-life of (a) and the $b_t$ denotes the half-life of (b).

DESCRIPTION OF THE PREFERRED EMBODIMENTS

The invention will be described in more detail in the following.

According to the present invention, the golf ball is formed by vulcanization from a rubber composition compounded from the following components.

(A) Rubber base material containing 60 to 100% by weight based on the weight of polybutadiene synthesized with a catalyst of rare earth element, which contains no less than 60% of cis-1,4-linkage and has a Mooney viscosity ($ML_{1+4}(100°\ C.)$) no smaller than 40.
(B) Unsaturated carboxylic acid.
(C) Metal oxide.
(D) Organic peroxide.
(E) Organic sulfur compound (optional).
(F) Inorganic filler (optional).

The polybutadiene as component (A) should contain cis-1,4-linkage in an amount no less than 60% by weight, preferably no less than 80% by weight, more preferably no less than 90% by weight, and most desirably no less than 95% by weight. An excessively small content of cis-1,4-linkage leads to poor rebound resilience.

In addition, the content of 1,2-vinyl linkage should be no more than 2% by weight, preferably no more than 1.7% by weight, and more preferably no more than 1.5% by weight.

The above-mentioned polybutadiene should have a Mooney viscosity ($ML_{1+4}(100°\ C.)$) no lower than 40, preferably no lower than 50, more preferably no lower than 52, and most desirably no lower than 54. Its upper limit is no higher than 140, preferably no higher than 120, more preferably no higher than 100, and most desirably no higher than 80.

Incidentally, the Mooney viscosity used in the present invention is an industrial viscosity index (conforming to JIS-K6300) measured by a Mooney viscometer, which is one kind of rotary plastometers. It is represented by the unit symbol of $ML_{1+4}(100°\ C.)$, in which M stands for Mooney viscosity, L stands for Large rotor (type L), 1+4 stands for 1 minute of duration of preliminary heating and 4 minutes of duration of rotation, and 100° C. denotes the heating temperature at which measurements are made.

The polybutadiene used in the present invention is one which is synthesized with a catalyst of rare earth element. This catalyst may be any known one.

The catalyst includes, for example, compounds of rare earth elements (lanthanoid), organoaluminum compounds, alumoxane, and halogen-containing compounds, which may optionally be combined with a Lewis base.

The compounds of lanthanoid rare earth elements mentioned above include halides, carboxylates, alcoholates, thioalcoholates, and amides of metals having an atomic number from 57 to 71.

The organoaluminum compounds mentioned above include those compounds which are represented by $AlR^1R^2R^3$ (where $R^1$, $R^2$, and $R^3$, which may be identical or different, each denotes hydrogen or a $C_{1-8}$ hydrocarbon residue).

The alumoxane mentioned above includes those compounds represented by the formula (I) or (II) below. It may be an association product of alumoxane which is described in Fine Chemical, 23, (9), 5(1994), J. Am. Chem. Soc., 115, 4971 (1993), and J. Am. Chem. Soc., 117, 6465 (1995).

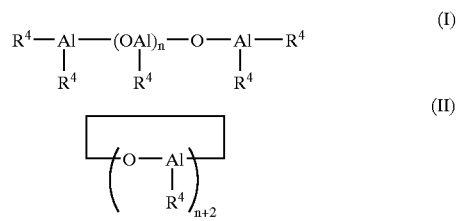

(where $R^4$ denotes a $C_{1-20}$ hydrocarbon group, and n denotes an integer of 2 or above.)

The halogen-containing compounds mentioned above include aluminum halides represented by $AlX_nR_{3-n}$ (where X denotes a halogen, R denotes a $C_{1-20}$ hydrocarbon group (such as alkyl group, aryl group, and aralkyl group), and n denotes 1, 1.5, 2, or 3) and strontium halides represented by $Me_3SrCl$, $Me_2SrCl_2$, $MeSrHCl_2$, and $MeSrCl_3$. Additional examples include such metal halides as silicon tetrachloride, tin tetrachloride, and titanium tetrachloride.

The Lewis base mentioned above is one which is used for complexing the compound of lanthanoid rare earth element. It includes acetylacetone and ketone alcohol.

According to the present invention, the compound of lanthanoid rare earth element may be a neodymium compound. The catalyst of this compound is desirable because of its polymerization activity which yields polybutadiene with a high content of 1,4-cis linkage and a low content of 1,2-vinyl linkage. Typical examples of the catalyst of rare earth element are described in JP-A 11-35633.

In polymerization of butadiene with a catalyst of rare earth element (which is a compound of lanthanoid rare earth element), the molar ratio of butadiene to the catalyst should be 1,000 to 2,000,000, preferably 5,000 to 1,000,000, so that the resulting polymer has the cis content and the Mw/Mn ratio as mentioned above. In the case where the catalyst is composed of $AlR^1R^2R^3$ and a compound of lanthanoid rare earth element, the molar ratio of butadiene to the catalyst should be 1 to 1000, preferably 3 to 500. In the case where the catalyst is composed of a halogen-containing compound and a compound of lanthanoid rare earth element, the molar ratio of butadiene to the catalyst should be 0.1 to 30, preferably 0.2 to 15. In the case where the catalyst is composed of a Lewis base and a compound of lanthanoid rare earth element, the molar ratio of butadiene to the catalyst should be 0 to 30, preferably 1 to 10. Polymerization may be achieved by solution polymerization (with a solvent) or bulk polymerization or gas phase polymerization (without a solvent). The polymerization temperature is usually from −30 to 150° C., preferably from 10 to 100° C.

According to the present invention, the polybutadiene as component (A) may optionally be treated, after its polymerization with the catalyst of rare earth element, with a terminal modifier which reacts with the active terminals of the polymer.

The terminal modifier may be selected from the following seven groups.

(1) Compounds having an alkoxysilyl group, such as alkoxysilane compounds having at least one epoxy group or isocyanate group in the molecule. Examples of the epoxy group-containing compounds include 3-glycidyloxypropyltrimethoxysilane, 3-glycidyloxypropyltriethoxysilane, (3-glycidyloxypropyl)methylmethoxysilane, (3-glycidyloxypropyl)methyldiethoxylsilane, β-(3,4-epoxycyclohexyl)trimethoxysilane, β-(3,4-epoxycyclohexyl)triethoxysilane, β-(3,4- epoxycyclohexyl)methyldimethoxysilane, β-(3,4-epoxycyclohexyl)ethyldimethoxysilane, condensate of 3-glycidyloxypropyltrimethoxysilane, and condensate of (3-glycidyloxypropyl)methyldiethoxylsilane. Examples of the isocyanate group-containing alkoxysilane compounds include 3-isocyanatepropyltrimethoxysilane, 3-isocyanatepropyltriethoxysilane, (3-isocyanatepropyl)methyldimethoxysilane, (3-isocyanatepropyl)methyldiethoxysilane, condensate of 3-isocyanatepropyltrimethoxysilane, and condensate of (3-isocyanatepropyl)methyldimethoxysilane.

The reaction of the alkoxysilyl compound with active terminals may be promoted by the addition of a Lewis acid, so that the Lewis acid catalyses and accelerates the coupling reaction. The modified polymer thus obtained has good storage stability owing to improved cold flow properties. Examples of the Lewis acid include dialkyltin dialkyl maleate, dialkyltin dicarboxylate, and aluminum trialkoxide.

(2) Organometal halide compounds and metal halide compounds represented by the following formulas.

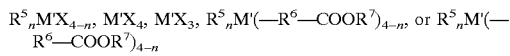
$R^5{}_nM'X_{4-n}$, $M'X_4$, $M'X_3$, $R^5{}_nM'(—R^6—COOR^7)_{4-n}$, or $R^5{}_nM'(—R^6—COOR^7)_{4-n}$ (where $R^5$ and $R^6$ (which are identical or different) each denote a $C_{1-20}$ hydrocarbon group, $R^7$ denotes a $C_{1-20}$ hydrocarbon group which may have a carbonyl group or ester group in the side chain, M' denotes tin, silicon, germanium, or phosphorus, X denotes halogen, and n is an integer of 0 to 3.)

(3) Heterocumulene compounds having the Y=C=Z linkage in the molecule (where Y denotes carbon, oxygen, nitrogen, or sulfur, and Z denotes oxygen, nitrogen, or sulfur).

(4) 3-membered heterocyclic compounds having the following linkage in the molecule.

(where Y denotes oxygen, nitrogen, or sulfur.)

(5) Halogenated isocyano compounds.

(6) Carboxylic acids, acid halides, ester compounds, carbonate ester compounds, and acid anhydrides represented by the following formulas.

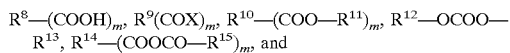
$R^8—(COOH)_m$, $R^9(COX)_m$, $R^{10}—(COO—R^{11})_m$, $R^{12}—OCOO—R^{13}$, $R^{14}—(COOCO—R^{15})_m$, and

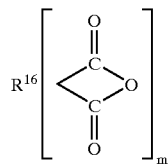

(where $R^8$ to $R^{16}$ (which may be identical or different) each denotes a $C_{1-50}$ hydrocarbon group, X denotes halogen, and m is an integer of 1 to 5.)

(7) Metal salts of carboxylic acid represented by the following formulas.

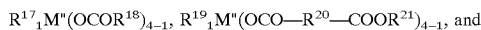
$R^{17}{}_lM''(OCOR^{18})_{4-l}$, $R^{19}{}_lM''(OCO—R^{20}—COOR^{21})_{4-l}$, and

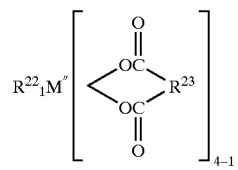

(where $R^{17}$ to $R^{23}$ (which may be identical or different) each denotes a $C_{1-20}$ hydrocarbon group, M'' denotes tin, silicon, or germanium, and l is an integer of 0 to 3.)

The examples and reactions of the terminal modifiers mentioned above are described in JP-A 11-35633, 7-268132, and 2002-293996.

According to the present invention, the above-mentioned polybutadiene should have a molecular weight distribution Mw/Mn (where Mw denotes the weight-average molecular weight and Mn denotes the number-average molecular weight) no less than 2.0, preferably no less than 2.2, more preferably no less than 2.4, and most desirably no less than 2.6. Its upper limit should be no more than 8.0, preferably no more than 7.5, more preferably no more than 4.0, and most desirably no more than 3.4. With an excessively small Mw/Mn, the polybutadiene will be poor in workability. Conversely, with an excessively large Mw/Mn, the polybutadiene will be poor in rebound resilience.

According to the present invention, the rubber base material is composed mainly of the above-mentioned polybutadiene. The content of the polybutadiene in the rubber base material should be no less than 60% by weight, preferably no less than 70% by weight, more preferably no less than 80% by weight, and most desirably no less than 85% by weight. The polybutadiene in the rubber base material may account for 100% by weight, 95% by weight or less, or 90% by weight or less.

Incidentally, the above-mentioned rubber base material may contain, in addition to the polybutadiene specified above, any polybutadiene synthesized with a catalyst of Group VIII metal, other diene rubbers (such as styrene-butadiene rubber), natural rubber, isoprene rubber, and ethylene-propylene-diene rubber.

The second polybutadiene (as an additional rubber component) should preferably be one which is synthesized with a catalyst of Group VIII metal. It should have a Mooney viscosity ($ML_{1+4}(100°$ C.$)$) lower than 50 and a solution viscosity no lower than 200 mPa·s and no higher than 400 mPa·s at 25° C. (5% by weight in toluene), so that the resulting rubber has high rebound resilience and good workability.

The catalyst of Group VIII metal mentioned above includes, for example, nickel catalysts and cobalt catalysts enumerated in the following.

Nickel catalysts: nickel-diatomaceous earth (one-component type), Raney nickel/titanium tetrachloride (two-component type), and nickel compound/organometallic compound/boron trifluoride etherate (three-component type). Incidentally, the nickel compound includes reduced nickel with a carrier, Raney nickel, nickel oxide, nickel carboxylate, and organic nickel complex salt. The organometallic compound includes trialkylaluminum (such as triethylaluminum, tri-n-propylaluminum, triisobutylaluminum, and tri-n-hexylaluminum), alkyllithium (such as n-butyllithium, sec-butyllithium, tert-butyllithium, and 1,4-dilithiumbutane), dialkylzinc (such as diethylzinc and dibutylzinc).

Cobalt catalysts: Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite, and cobalt dinitrocyclochloride. They should preferably be used in combination with a dialkylaluminum monochloride (such as diethylaluminum monochloride and diisobutylaluminum monochloride), a trialkylaluminum (such as triethylaluminum, tri-n-propylaluminum, triisobutylaluminum, and tri-n-hexylaluminum), an aluminum alkylsesquichloride (such as ethylaluminum sesquichloride), or aluminum chloride.

The catalyst of Group VIII metal mentioned above (particularly nickel-based catalyst or cobalt-based catalyst) is used for polymerization in such a way that it is continuously fed, together with butadiene monomer, into the reactor. Polymerization should be carried out at a reaction temperature of 5 to 60° C. and a reaction pressure ranging from about 1 to 70 atm, so that the resulting rubber has the Mooney viscosity specified above.

The second polybutadiene should have a molecular weight distribution Mw/Mn (where Mw denotes the weight-average molecular weight and Mn denotes the number-average molecular weight) no less than 3.0, preferably no less than 3.3, more preferably no less than 3.6, and most desirably no less than 3.9. Its upper limit should be no more than 6.0, preferably no more than 5.5, more preferably no more than 5.0, and most desirably no more than 4.5. This requirement is necessary for the polybutadiene to exhibit high rebound resilience without loss in workability.

The second polybutadiene mentioned above should have a Mooney viscosity lower than 50, preferably lower than 48, more preferably lower than 46, and most desirably lower than 45. The lower limit of Mooney viscosity should be no lower than 10, preferably no lower than 20, more preferably no lower than 25, and most desirably no lower than 30.

Also, the second butadiene should have a solution viscosity η (5% by weight in toluene at 25° C.) no lower than 100 mPa·s, preferably no lower than 120 mPa·s, more preferably no lower than 140 mPa·s, further preferably no lower than 160 mPa·s, and most desirably no lower than 200 mPa·s, and no higher than 500 mPa·s, preferably no higher than 450 mPa·s, more preferably no higher than 400 mPa·s, further preferably no higher than 350 mPa·s, and most desirably no higher than 300 mPa·s.

Incidentally, the solution viscosity η (mPa·s) (5% by weight in toluene at 25° C.) is a viscosity of a solution containing a polybutadiene sample (2.28 g) dissolved in toluene (50 mL), which is measured at 25° C. by using a specific viscometer which has been calibrated with the standard solution (JIS-Z8809).

The amount of the second polybutadiene in the rubber base material should be no less than 0%, preferably no less than 5%, and more preferably no less than 10%, and no more than 40%, preferably no more than 30%, more preferably no more than 20%, and most desirably no more than 15%.

Next, the unsaturated carboxylic acid as component (B) includes acrylic acid, methacrylic acid, maleic acid, and fumaric acid, with acrylic acid and methacrylic acid being particularly preferable.

The amount of the unsaturated carboxylic acid as component (B), based on 100 parts by weight of the rubber base material as component (A), should be no less than 10 parts by weight, preferably no less than 15 parts by weight, and more preferably no less than 20 parts by weight. Its upper limit should be no more than 40 parts by weight, preferably no more than 35 parts by weight, more preferably no more than 33 parts by weight, further preferably no more than 30 parts by weight, and most desirably no more than 27 parts by weight.

The metal oxide as component (C) should preferably be zinc oxide or titanium oxide.

The amount of the metal oxide as component (C), based on 100 parts by weight of the rubber base material as component (A), should be no less than 10 parts by weight, preferably no less than 15 parts by weight, and more preferably no less than 20 parts by weight. Its upper limit should be no more than 60 parts by weight, preferably no more than 50 parts by weight, more preferably no more than 45 parts by weight, further preferably no more than 40 parts by weight, and most desirably no more than 30 parts by weight.

The organic peroxide as component (D) in the present invention may be any known one, such as dicumyl peroxide, 1,1'-bis(t-butylperoxy)-3,5,5-trimethylcyclohexane, and α,α'-bis(t-butylperoxy)diisopropylbenzene. These organic peroxides are commercially available under the trade name of "Percumyl D" (from NOF Corporation), "Perhexa 3M" (from NOF Corporation), and "Luperco 231XL" (from Elf Atochem North America, Inc.).

These organic peroxides may be used singly or in combination with one another. It is desirable to use two or more kinds in combination from the standpoint of rebound resilience. In this case, the one having the shortest half-life (at 155° C.) is referred to as component (a), and the one having the longest half-life (at 155° C.) is referred to as component (b). If component (a) has a half-life of $a_t$ and component (b) has a half-life of $b_t$, then the ratio of $b_t/a_t$ should be no less than 7, preferably no less than 8, more preferably no less than 9, and most desirably no less than 10, and no more than 20, preferably no more than 18, and more preferably no more than 16. Even though two or more kinds of organic peroxides are used, the resulting rubber might be poor in rebound resilience, compression, and durability if they do not meet the above-mentioned requirement.

The half-life $a_t$ (at 155° C.) of component (a) should be no less than 5 seconds, preferably no less than 10 seconds, and more preferably no less than 15 seconds, and no more than 120 seconds, preferably no more than 90 seconds, and more preferably no more than 60 seconds. The half-life $b_t$ (at 155° C.) of component (b) should be no less than 300 seconds, preferably no less than 360 seconds, and more preferably no less than 420 seconds, and no more than 800 seconds, preferably no more than 700 seconds, and more preferably no more than 600 seconds.

The organic peroxide as component (a) should preferably be 1,1-bis(t-butylperoxy)-3,5,5-trimethyl-cyclohexane. The organic peroxide as component (b) should preferably be dicumyl peroxide.

The total amount of the organic peroxides mentioned above, based on 100 parts by weight of the rubber base material as component (A), should be no less than 0.9 part by weight, preferably no less than 0.95 part by weight, more preferably no less than 1 part by weight, and most desirably no less than 1.05 parts by weight. Its upper limit should be no more than 5 parts by weight, preferably no more than 4 parts by weight, more preferably no more than 3 parts by weight, further preferably no more than 2 parts by weight, and most desirably no more than 1.5 parts by weight. With an excessively small amount, the resulting rubber composition takes a long time for crosslinking (which leads to low productivity) and has large compression. With an excessively large amount, the resulting rubber is poor in rebound resilience and durability.

In the case where components (a) and (b) (or more components) are used, the amount of component (a), based on 100 parts by weight of component (A), should be no less than 0.45 part by weight, preferably no less than 0.6 part by weight, more preferably no less than 0.8 part by weight, and most desirably no less than 0.9 part by weight. Its upper limit should be no more than 2.5 parts by weight, preferably no more than 2 parts by weight, more preferably no more than 1.5 parts by weight, and most desirably no more than 1.3 parts by weight. The amount of component (b) should be no less than 0.45 part by weight, preferably no less than 0.6 part by weight, more preferably no less than 0.8 part by weight, and most desirably no less than 0.9 part by weight. Its upper limit should be no more than 2.5 parts by weight, preferably no more than 2 parts by weight, more preferably no more than 1.5 parts by weight, and most desirably no more than 1.3 parts by weight.

According to the present invention, the rubber composition should preferably be incorporated with an organic sulfur compound as component (E).

The organic sulfur compound as component (E) includes thiophenol, thiophthol, halogenated thiophenol, and metal salts thereof. Their typical examples include pentachlorothiophenol, pentafluorothiophenol, pentabromothiophenol, and parachlorothiophenol, and zinc salts thereof; diphenylpolysulfide, dibenzylpolysulfide, dibenzoylpolysulfide, dibenzothiazoylpolysulfide, dithiobenzoylpolysulfide (polysulfide having 2–4 sulfur atoms), alkylphenyldisulfide, sulfur compounds having a furan ring, and sulfur compounds having a thiophen ring. Of these examples, zinc salt of pentachlorothiophenol and diphenyldisulfide are preferable.

The amount of component (E), based on 100 parts by weight of the rubber base material as component (A), should be no less than 0 part by weight, preferably no less than 0.2 part by weight, more preferably no less than 0.4 part by weight, and most desirably no less than 0.7 part by weight, and no more than 5 parts by weight, preferably no more than 4 parts by weight, more preferably no more than 3 parts by weight, and most desirably no more than 2 parts by weight, particularly no more than 1.5 parts by weight. With an excessively small amount, component (E) does not produce the effect of improving rebound resilience. With an excessively large amount, the resulting rubber is too soft to produce the desired rebound resilience.

According to the present invention, the rubber composition may optionally be incorporated with an inorganic filler as component (F). Examples of the inorganic filler as component (F) include barium sulfate and calcium carbonate (other than oxides). The amount of component (F), based on 100 parts by weight of component (A), should be no less than 0 part by weight, preferably no less than 5 parts by weight, more preferably no less than 7 parts by weight, further preferably no less than 10 parts by weight, and most desirably no less than 13 parts by weight. Its upper limit should be no more than 80 parts by weight, preferably no more than 65 parts by weight, more preferably no more than 50 parts by weight, and most desirably no more than 40 parts by weight. With an excessively small or large amount, the resulting golf ball will not have the specified weight and desired rebound resilience.

Moreover, the rubber composition may optionally be incorporated with an antioxidant. The amount of antioxidant, based on 100 parts by weight of component (A), should be no less than 0.05 part by weight, preferably no less than 0.1 part by weight, and more preferably no less than 0.2 part by weight, and no more than 3 parts by weight, preferably no more than 2 parts by weight, more preferably no more than 1 part by weight, and most desirably no more than 0.5 part by weight. The antioxidant may be commercially available under the trade name of "Nocrac NS-6" and "Nocrac NS-30" (both from Ouchishinko Chemical Industrial Co., Ltd.) and "Yoshinox 425" (from Yoshitomi Pharmaceutical Industrial Co., Ltd.).

According to the present invention, the one-piece golf ball can obtained by vulcanizing and curing the above-mentioned rubber composition in the usual way. Vulcanization may take 10 to 40 minutes at 100 to 200° C.

According to the present invention, the one-piece golf ball (obtained by molding and vulcanization) is not specifically restricted in hardness; the hardness may be uniform or varied from the center to the surface.

According to the present invention, the one-piece golf ball should have an amount of defection under a load of 980 N (100 kg) which is no less than 2.0 mm, preferably no less than 2.5 mm, more preferably no less than 2.8 mm, and most desirably no less than 3.2 mm. Its upper limit should be no more than 6.0 mm, preferably no more than 5.5 mm, more preferably no more than 5.0 mm, and most desirably no more than 4.5 mm. With an excessively small amount of deflection, the resulting golf ball is poor in shot feeling and is also poor in flying performance owing to spin at the time of long shot because the ball undergoes large deformation by the driver. On the other hand, with an excessively large amount of deflection, the resulting golf ball is poor in shot feeling and rebound resilience (and hence flying performance) and is subject to cracking by repeated shots.

The one-piece golf ball mentioned above should have a specific gravity ($g/cm^3$) no less than 0.9, preferably no less than 1.0, and more preferably no less than 1.1. Its upper limit should be no more than 1.4, preferably no more than 1.3, and more preferably no more than 1.2.

The one-piece golf ball mentioned above, within the scope of the golf rule, should have a diameter no less than 42.67 mm and a weight no more than 45.93 g. The upper limit of the diameter should be no more than 44.0 mm, preferably no more than 43.5 mm, and most desirably no more than 43.0 mm. The lower limit of the weight should be no less than 44.5 g, preferably no less than 45.0 g, more preferably no less than 45.1 g, and most desirably no less than 45.2 g.

The one-piece golf ball according to the present invention is superior in moldability by extrusion and also in shot feeling and rebound resilience.

EXAMPLES

The present invention will be described in more detail with reference to the following Examples and Comparative Examples, which are not intended to restrict the scope thereof.

Examples 1 to 6 and Comparative Examples 1 to 4

In each example, a one-piece solid golf ball, having an outside diameter of 42.7 mm and a weight of 45.3 g, was made from the rubber composition shown in Table 2 by vulcanization at 170° C. for 30 minutes. This rubber composition contains the polybutadiene (BR) specified in Table 1. The surface of the golf ball has dimples formed therein and is coated with a paint.

The thus obtained golf ball was tested for deflection under a load of 100 kg (980 N), rebound resilience, and flying performance in the following manner. The results are shown in Table 2.

Deflection Under a Load of 100 kg

The amount of deflection (in mm) which the golf ball sample experiences under a load of 100 kg (980 N) is measured.

Rebound Resilience

The initial velocity is measured with an initial velocity meter of the same type as approved by the official organization USGA. The result is expressed in terms of difference from the data in Comparative Example 1.

Flying Performance

The carry and the total distance are measured by hitting the golf ball sample at a head speed of 45 m/s with a driver (W#1, Tour Stage X500, loft 9°, shaft X, made by Bridgestone Sports Co., Ltd.) mounted on a hitting machine.

Evaluation of Workability in Extrusion

The slug obtained by extrusion is rated for skin and shape according to the following criterion.

4: the slug has a very smooth skin and is satisfactory.

3: the slug has a slightly rough skin but is satisfactory.

2: the slug has a fluffy skin but is capable of extrusion.

1: the slug is poor in shape and is incapable of predetermined amount of extrusion.

TABLE 1

| | Kind | Producer | Catalyst | | Content of cis-1,4-linkage (%) | Content of 1,2-vinyl linkage (%) | Mooney viscosity ($ML_{1+4}$ (100° C.)) | Molecular weight distribution Mw/Mn | Solution viscosity at 25° C. in 5% toluene (mPa · s) |
|---|---|---|---|---|---|---|---|---|---|
| BR | BR01 | JSR | Ni | Group VIII | 96 | 2.5 | 46 | 4.2 | 150 |
| | BR11 | Corporation | Ni | Group VIII | 96 | 2 | 43 | 4.4 | 270 |
| | HCBN-13 | | Nd | Rare earth element | 96 | 1.3 | 54 | 3.2 | 475 |
| | CNB700 | | Nd | Rare earth element | 96.2 | 1.3 | 43 | 2.8 | 280 |

TABLE 2

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Formulation (parts by weight) | | | | | | | | | | | |
| BR | BR01 | | | 20 | | | | 100 | | | 80 |
| | BR11 | | 20 | | | | | | | | |
| | HCBN-13 | 100 | 80 | 80 | | 100 | 100 | | 100 | 100 | 20 |
| | CNB700 | | | | 100 | | | | | | |
| (a) Perhexa 3M-40 (half-life 40) | Nominal Actual | | | | | | 0.7 (0.28) | | | | |
| (b) Percumyl D (half-life 480) | | 1 | 1 | 1 | 1 | 0.7 | 1 | 1 | 1 | 1 | 1 |
| Zinc oxide | | 23 | 23 | 23 | 23 | 23 | 23 | 23 | 23 | 23 | 23 |
| Titanium oxide | | 1 | 1 | 1 | 1 | 1 | 1 | 1 | 1 | 1 | 1 |
| Antioxidant | | 0.2 | 0.2 | 0.2 | 0.2 | 0.2 | 0.2 | 0.2 | 0.2 | 0.2 | 0.2 |
| Methacrylic acid | | 22 | 22 | 22 | 22 | 21 | 25 | 23 | 43 | 9 | 23 |
| Zinc salt of pentachlorothiophenol | | | | | | | 1 | | | | |
| Performance | | | | | | | | | | | |
| Deflection under a load of 100 kg (mm) | | 2.6 | 2.7 | 2.7 | 2.6 | 2.7 | 2.8 | 2.7 | 1.5 | 5.2 | 2.7 |
| Rebound resilience (m/s) | | 0.5 | 0.4 | 0.3 | 0.3 | 0.7 | 0.9 | 0.0 | 1.2 | −2.5 | 0.1 |
| Shot feeling | | good | good | good | good | good | good | good | too hard | too soft | good |
| Extrusion workability #W1 HS45 | | 2 | 4 | 3 | 2 | 2 | 2 | 4 | 2 | 2 | 4 |
| Carry (m) | | 204.0 | 202.5 | 201.9 | 202.1 | 207.2 | 209.5 | 199.4 | 210.6 | 190.0 | 199.9 |
| Total (m) | | 220.0 | 218.0 | 216.0 | 216.1 | 221.5 | 223.7 | 212.6 | 224.8 | 195.5 | 213.3 |

Note:
Perhexa 3M-40: 40% diluted product (actual amount is shown in parentheses)
Comparative Example 1: The resulting golf ball is poor in rebound resilience because it is formed solely from low-resilient BR which has been synthesized with an Ni catalyst.
Comparative Example 2: The resulting golf ball has a hard shot feeling because it is formed from a rubber composition containing an excessively large amount of methacrylic acid.
Comparative Example 3: The resulting golf ball is poor in rebound resilience because it is formed from a rubber composition containing an excessively small amount of methacrylic acid.
Comparative Example 4: The resulting golf ball is poor in rebound resilience because it is formed from a rubber composition containing a small amount of BR synthesized with an Ni catalyst.

Japanese Patent Application No. 2002-347999 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A one-piece golf ball formed by vulcanization from a rubber composition composed of 100 parts by weight of rubber base material, 10 to 40 parts by weight of unsaturated carboxylic acid, 10 to 60 parts by weight of metal oxide, and 0.9 to 5 parts by weight of organic peroxide, said rubber base material containing 60 to 100% by weight based on the weight of a polybutadiene which is synthesized with a catalyst of rare earth element, contains no less than 60% of cis-1,4-linkage, and has a Mooney viscosity ($ML_{1+4}(100°$ C.$)$) no less than 52, wherein the rubber base material contains, in addition to the polybutadiene, no more than 40% by weight of a second polybutadiene which is synthesized with a catalyst of Group VIII element and has a Mooney viscosity ($ML_{1+4}(100°$ C.$)$) less than 50.

2. The one-piece golf ball of claim 1, wherein the polybutadiene is one which has a molecular weight distribution Mw/Mn of 2.0 to 8.0 (where Mw stands for weight-average molecular weight and Mn stands for number-average molecular weight).

3. The one-piece golf ball of claim 1, wherein the polybutadiene is one which is obtained by synthesis with an Nd-based catalyst and subsequent reaction with a terminal modifier.

4. The one-piece golf ball of claim 1, wherein the second polybutadiene is one which has a molecular weight distribution Mw/Mn of 3.0 to 6.0 and a solution viscosity no less than 100 mPa·s and no more than 500 mPa·s in toluene (5% by weight) at 25° C.

5. The one-piece golf ball of claim 1, wherein the rubber base material contains (based on 100 parts by weight) 0.2 to 5 parts by weight of organic sulfur compound.

6. A one-piece golf ball formed by vulcanization from a rubber composition composed of 100 parts by weight of rubber base material, 10 to 40 parts by weight of unsaturated carboxylic acid, 10 to 60 parts by weight of metal oxide, and 0.9 to 5 parts by weight of organic peroxide, said rubber base material containing 60 to 100% by weight based on the weight of a polybutadiene which is synthesized with a catalyst of rare earth element, contains no less than 60% of cis-1,4-linkage, and has a Mooney viscosity ($ML_{1+4}(100°$ C.$)$) no less than 52, wherein the rubber composition contains two or more kinds of organic peroxide, the one with a shortest half-life (at 155° C.) being designated as (a) and the other with a longest half-life being designated as (b), such that the ratio $b_t/a_t$ is no less than 7 and no more than 20, where $a_t$ denotes the half-life of (a) and the $b_t$ denotes the half-life of (b).

* * * * *